United States Patent [19]

Pick

[11] 4,451,048

[45] May 29, 1984

[54] HIGH SPEED SHAFT SEAL

[76] Inventor: Steve J. Pick, 10551 Park Villa La., Villa Park, Calif. 92667

[21] Appl. No.: 425,562

[22] Filed: Sep. 28, 1982

[51] Int. Cl.³ .................... F16J 15/34; F16J 15/48
[52] U.S. Cl. .................................. 277/27; 277/83
[58] Field of Search .................................. 277/83, 27

[56] References Cited

U.S. PATENT DOCUMENTS

| | | | |
|---|---|---|---|
| 2,124,526 | 7/1938 | Goldsworthy | 277/83 |
| 2,931,783 | 2/1961 | Laser | 277/83 |
| 4,065,136 | 12/1977 | Miller | 277/27 |
| 4,114,900 | 9/1978 | Wiese | 277/27 |
| 4,289,264 | 9/1981 | Rawlins | 277/27 |
| 4,337,951 | 7/1982 | Perego | 277/83 |

Primary Examiner—Robert I. Smith
Attorney, Agent, or Firm—Knobbe, Martens, Olson & Bear

[57] ABSTRACT

A dynamic shaft seal for bidirectionally sealing fluid flow along a shaft comprising a disc of carbon material positioned between a pair of spaced flat rings mounted for rotation with the shaft. The carbon disc is allowed a range of axial movement forced by a pressure differential across the carbon disc so that the disc can form a contact seal with one or the other of the flat rings. The carbon disc is allowed to float between the flat rings when pressure on opposing sides of the carbon disc are equalized. Means are included to prohibit rotation of the carbon disc with the shaft.

11 Claims, 6 Drawing Figures

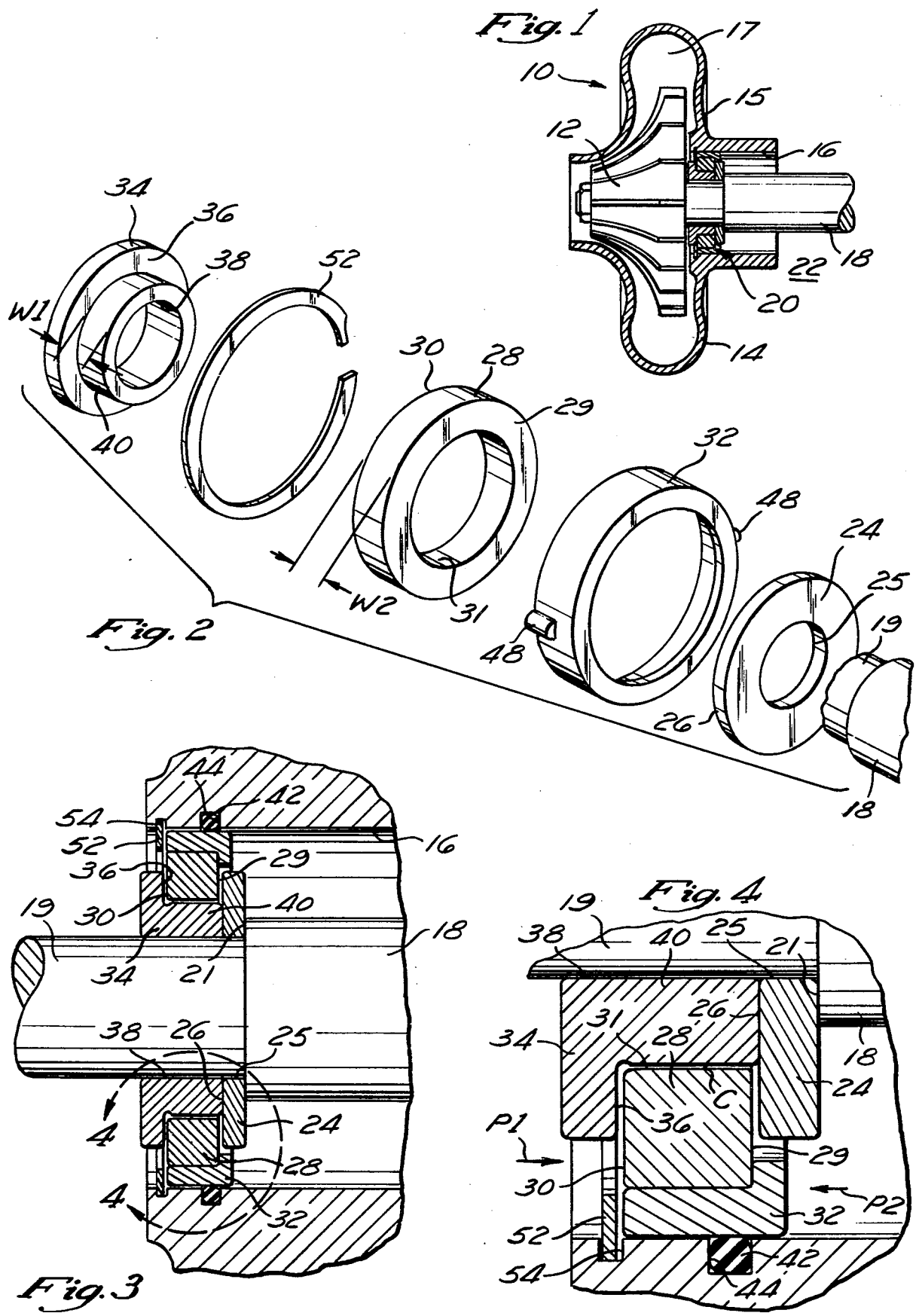

HIGH SPEED SHAFT SEAL

BACKGROUND OF THE INVENTION

This invention relates generally to shaft seals for separating high and low pressure chambers between which a rotating shaft extends to prohibit fluid flow along the shaft, and more particularly to a shaft seal which accomplishes the aforementioned objectives for a high speed shaft in a high temperature environment.

The difficulties associated with achieving a durable and effective dynamic seal around a moving shaft has concerned machine designers for many years. To restrain fluid under pressure, a dynamic seal must bear a hydraulic load. This load generally forces the seal against a moving surface of a shaft around which it is positioned thereby forming bearing surfaces which requires lubrication. In seals of the prior art, the presence of a film of lubricant between moving bearing surfaces is vital to obtain adequate service life for the seal; however, the presence of a lubricant film also means that a certain amount of leakage will occur.

In environments where a seal operates to restrain low viscosity fluid under high pressure leakage problems are aggravated. However reducing film thickness to reduce leakage between the seal and the moving shaft surface causes high friction resulting in heat build-up, which is a factor most detrimental to seal service life.

Dynamic seals known in the prior art include the O-ring seal, the mechanical seal, the labyrinth seal, and the controlled gap seal. The O-ring seal is a very simple contact type seal consisting of an annular ring made of a flexible and elastomeric material. The annular ring is positioned in a mating groove formed on one part, which captures the sides of the ring and exposes a portion to contact an adjacent surface of a second part to form a seal. However, the O-ring seal is a precision part which requires a high degree of dimensional accuracy in the manufacture of interworking parts to maintain sufficient assembly tolerances to form a seal. Furthermore, O-ring seals generally are not very durable when used with reciprocating or rotating elements which are continuously in motion, or moving at high speeds.

The mechanical seal comprises a mating pair of elements which have opposing flat surfaces that are brought into contact to form the seal. The flat surfaces or faces generally move in contact with one another, and must be very smooth to maintain a seal. An example is a ring seal which comprises a circular metal ring having a rectangular cross-section, which resides in a mating groove similar to an O-ring seal and presents a flat face for sealing contact with another part. The relative hardness of the contacting faces is very important to the maintenance of smooth sealing surfaces which will endure the friction generated through their movement. In the event of failure of the mechanical seal due to roughening of the contacting surfaces, a considerable amount of work is generally required in order to renew the seal.

Both the O-ring seal and the mechanical seal require a high degree of accuracy in surface finish and dimensional tolerance. Also, a film of lubricant having a very low particulate content must be used between mating surfaces of these seals in order to prevent rapid wear of the sealing surfaces.

The labyrinth seal and the controlled gap seal are generally used for high speed applications in which it is desirable to eliminate all rubbing contact between elements of the seal and the shaft. The labyrinth seal, though not a positive contact type seal, adequately restricts fluid flow by creating a tortuous path through which fluid must travel and by inducing high degrees of turbulence, both of which restrict flow. The controlled gap seal is a non-contact type seal presently used in gas turbines where pressure differentials across the seal are small to moderate and where small amounts of leakage are tolerable. The controlled gap seal consists of a circumferential ring sized to maintain a specified small clearance with the shaft surface. The ring is constructed of a material which will maintain the specified clearance through a large range of operating temperatures.

Prior art contact type seals have suffered failure when used in high speed applications, due to high friction and excessive heat build-up generated by contacting surfaces when moved relative to one another. Labyrinth and controlled gap non-contact seals lack adequate performance when used in environments of low viscosity fluids and varying pressure differentials across the seal.

A need for an efficient shaft seal which performs in a variable pressure environment of low viscosity fluid endures in the field of shaft seals and particularly for radial compressors and turbines. For example, a supercharger which comprises a rotatry compressor impeller mounted to a shaft and positioned within a discharge housing is exemplary of an application in which such a seal is essential. When the impeller is spun at very high speeds air pressure is created within the discharge housing. This requires a seal between the housing and the shaft on which the impeller is mounted to prevent leakage of the compressed air around the shaft. Since air is characterized by very low viscosity, the seal must be very efficient. During certain phases of supercharger operation it is also possible for a negative pressure, or vacuum, to be formed within the discharge housing, requiring the shaft seal to block air flow leakage along the shaft into the discharge housing from the atmosphere or an adjacent drive chamber. Since the impeller of a supercharger must spin at very high speeds to obtain the desired pressure increase within the discharge housing, speeds as high as 100,000 rpm, the seal must also be extremely durable to withstand continuous operation at these high shaft speeds. Because large amounts of heat are generated from the friction caused by the rubbing of the surfaces of the seal in contact with the shaft, and from the heat generated from compression of the air within the housing, the seal must also be able to withstand very high temperatures without suffering loss of seal service life. The shaft seal must allow minimal leakage into or out of the discharge housing along the shaft to prevent undesirable effects, such as excessive oil consumption where shaft lubricants would be drawn into the housing, mixture dilution from air leakage into the housing, or pressure loss due to leakage out of the compressor housing. Any of these situations may result in undesirable combustion characteristics of an engine which the supercharger supports. The increased use of superchargers, and related turbochargers, in consumer oriented applications place greater importance on the service life of the seals used.

Another example of an application in which a high speed shaft seal must perform efficiently while maintaining a long service life is a gas turbine engine. Shaft seals used in a gas turbine engine must effectively seal the compression and combustion chambers of the engine from adjacent lubrication chambers supplying lubricant to the shaft support bearings. Seal efficiency is necessary to prevent contamination of the lubricant within the lubrication chambers to prevent leakage of the lubricants into the compression or combustion chambers. Shaft seals must provide effective separation of these chambers at very high shaft speeds and at extremely high temperatures.

The foregoing applications illustrate the prevalent need for a dynamic shaft seal which provides very high sealing efficiency and operates in varying bidirectional pressure differentials where shaft speeds are in excess of 100,000 revolutions per minute. The seal must also achieve a service life of several thousand hours in high temperature and corrosive enivronments.

SUMMARY OF THE INVENTION

A high speed shaft seal presented in this application overcomes the deficiencies of prior art dynamic seals by accomplishing efficient seal performance for low viscosity fluids in changing pressure environments, while providing extended service life. The seal comprises a disc made of carbon material which encircles the shaft and is positioned between spaced apart flat rings mounted on the shaft. The carbon disc has a central opening through which the shaft extends which is sized to closely surround the shaft without touching its surface to substantially restrict leakage flow by labyrinth seal technique. The carbon disc presents substantially flat radial surfaces on opposing sides for engagement with one or the other of the flat rings. The carbon disc is slightly narrower in width than the spacing between the flat rings, allowing the carbon disc to float between the rings and permitting a flat radial surface of the carbon disc to contact one or the other of the adjacent sides of the flat rings to form a positive seal. Movement of the carbon disc is obtained by the pressure differential formed between opposing sides of the carbon disc by fluid trying to escape along the shaft, which forces the disc against one of the flat rings.

When pressures are equalized on opposing sides of the carbon disc, the disc is free to float between the spaced flat rings due to the elimination of any force induced by leakage flow to direct the carbon ring, thereby reducing wear.

The circumference of the carbon disc is provided with a seal to prohibit leakage between the disc and the housing supporting disc, while allowing the carbon disc a range of movement to engage one or the other of the pair of flat rings. An anti-rotation means cooperating between the carbon disc and the housing prevents rotational movement of the carbon disc within the housing urged by the high speed rotating shaft and the flat rings when sealing contact is made. While prohibiting rotation, the anti-rotation means allows the carbon disc axial freedom of movement between the spaced flat rings. This freedom of movement provides wear compensation for both flat radial surfaces of the carbon disc. Prohibiting rotation of the carbon disc maintains the integrity and service life of the disc-housing seal when the shaft is rotating at high speeds, and when operating in high temperature environments.

The present invention provides a seal which is capable of sustained operation at shaft speeds of 100,000 revolutions per minute or more, with pressure differentials of up to 100 lbs. per square inch in hostile enivronments such as exist in turbochargers, superchargers and gas turbine engines. A seal manufactured according to the present invention provides simplicity of assembly and gives the durability required in aircraft and consumer automotive applications. Advantageously, the seal effected by the carbon disc is self-lubricating eliminating the need for oil films between contacting surfaces to obtain satisfactory service life. Further, the floating operation of the carbon disc provides a selfadjusting characteristic of the seal to accommodate for wear.

DESCRIPTION OF THE DRAWINGS

FIG. 1 is a partial sectional side view of a turbine compressor showing the application of a dynamic shaft seal;

FIG. 2 is an exploded assembly view of the elements comprising a dynamic shaft seal;

FIG. 3 is a sectional side view of a dynamic shaft seal taken along a diameter of the seal, depicting the seal mounted on a shaft;

FIG. 4 is an enlarged sectional view of portion 4—4 of FIG. 3, depicting operation of the dynamic shaft seal;

DETAILED DESCRIPTION OF THE INVENTION

Figure 5:
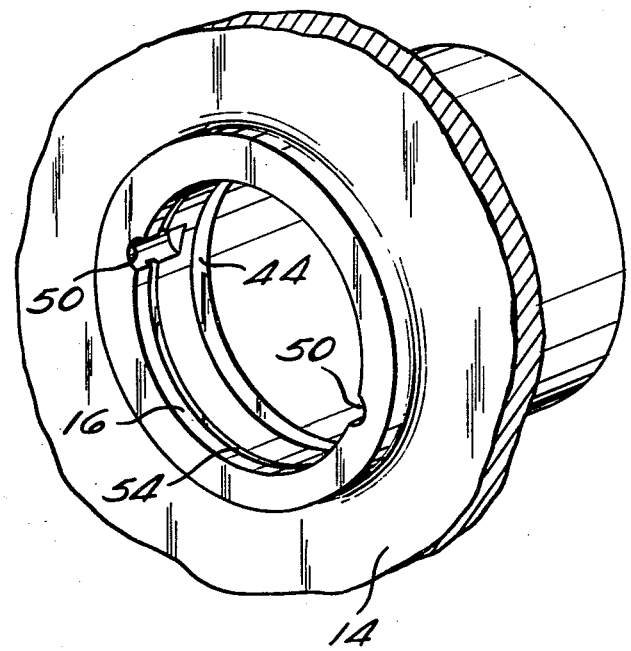
FIG. 5 is a perspective view of a bore through a turbine housing in which the dynamic shaft seal is supported.

The application of a dynamic shaft seal as presented in this application is generally described with reference to FIG. 1, which depicts a turbine 10 in which the shaft seal 20 is used. The turbine 10 comprises a circular impeller 12 which is concentrically positioned within a housing 14. The impeller is rotated on a shaft 18 which extends through a housing wall 15. The shaft 18 mounting the impeller 12 is supported by bearings (not shown) positioned in a bore 16 through the housing wall 15.

The housing 14 defines a pressure chamber 17 in which high fluid pressures are generated by the spinning turbine 12. The high pressure chamber 17 communicates with bore 16 through which the shaft 18 supporting the turbine 12 extends, requiring a shaft seal 20 to prevent fluid leakage. The shaft seal 20 prohibits fluid flow between the pressure chamber 17 and an adjacent chamber, or the outside environment, designated as 22, through the bore 16 along the shaft 18. When the pressure chamber 17 is charged with a higher pressure than the pressure existing in chamber 22, fluid flow must be prohibited from chamber 17 to chamber 22. Similarly, when the pressure of chamber 17 is negative, or a vacuum, and therefore lower than chamber 22, fluid flow must be prohibited into the chamber 17 from chamber 22. An effective seal 20 must be capable of blocking the bidirectional flow of both gaseous and liquid fluids between the chambers 17 and 22 while the shaft 18 is turning at very high speeds. A dynamic seal capable of preventing fluid leakage in the environment described in FIG. 1, is shown in FIGS. 2 and 5.

Referring first to FIG. 2, the individual elements of the preferred embodiment of the shaft seal 20 are shown. The elements of shaft seal 20 surround a smaller diameter end portion 19 of shaft 18 which provides a shoulder 21 around the shaft. A first ring 24 is discoid in shape and has a central opening 25 for receiving shaft end portion 19. The central opening 25 is sized to provide a fluid-tight seal between first ring 24 and the surface of shaft end portion 19 when the ring 24 is positioned over the shaft. The first ring 24 has a substantially flat radial face 26 on one side providing an axially directed sealing surface.

A second ring 34 has an outer portion discoid in shape and mounted on shaft end portion 19 adjacent to ring 24. The second ring 34 has a central opening 38 sized to provide a fluid-tight seal with the surface of end portion 19 of the shaft 18 when mounted and has a substantially flat radial face 36 on one side providing an axially directed sealing surface. Ring 34 is mounted with side face 36 facing side face 26 of ring 24 to provide opposing sealing surfaces. The side face 36 of ring 34 is spaced from side face 26 of ring 24 by a spacing member 40. The spacing member 40 is preferably a hub integrally formed with ring 34, as shown; however, the spacing member 40 may be provided as an individual spacing element which is assembled between the rings 24 and 34 on shaft end portion 19. The width of the spacing member 40 is indicated by W1.

A disc 28 made of carbon material is positioned between the rings 24 and 34. The carbon disc 28 presents radial side surfaces 29 and 30 which are substantially flat for engagement with the corresponding adjacent side surface 26 or 36 of the ring 24 or 34, respectively. A central opening 31 is formed through the carbon disc 28 having a diameter to closely surround the circumference of spacing member 40 which extends through the opening 31 in assembly, providing a minimal clearance between the circumference of spacing member 40 and the inner surface of opening 31 to restrict fluid flow between the carbon disc 28 and the spacing element 40 without frictional contact. The carbon disc 28 is sized narrower in width, W2, than the width W1 of spacing member 40, which determines spacing between the first and second ring faces 26 and 36. The narrower width W2 provides the carbon disc 28 with a range of axial movement between the faces 26 and 36 of rings 24 and 34, respectively, such that a side surface 29 or 30 of the carbon disc 28 may contact only one or the other of faces 26 or 36 of the first ring 24 or second ring 34.

The carbon disc 28 is tightly fitted into an outer ring 32 which provides axial and radial support for the carbon disc 28. The outer diameter of ring 32 is sized to provide a sliding fit of ring 32 within bore 16, shown in FIG. 5. The surface finish of the circumferential surface of ring 32 is smooth to accomplish sealing engagement of the ring 32 with an O-ring 42 held within a groove 44 formed in the interior wall of the bore 16. The O-ring seal 42 between the housing bore 16 and the ring 32 prohibits fluid leakage between the bore 16 and the ring and carbon disc assembly 32 and 28, respectively, while allowing the ring and carbon disc assembly axial freedom of movement within the bore 17 allowing the carbon disc 28 to float between rings 34 and 24.

Means for prohibiting rotation of the carbon disc 28 with the rings 24 and 34 and shaft 18 is provided by a pair of tongue-shaped protrusions 48 extending from the outer surface of ring 32. As the ring 32 is inserted into the bore 16, the tongues 48 engage a pair of mating grooves 50 formed in the wall of bore 17. The grooves 50 are formed having sufficient length to allow the ring and carbon disc assembly, 32 and 28, a range of axial movement, while prohibiting rotation of the ring and carbon disc assembly within the bore 17. The tongues 48 and the grooves 50 are preferably positioned at 180° intervals around the circumference of ring 32 and the bore 17 to provide for uniform loading in restraining rotation of the carbon disc 28 in the bore 17 to assure there is no binding interference of the axial sliding movement of the carbon disc 28 within the housing bore 17. When more than a pair of tongues and grooves, 48 and 50, are desired, it is preferred that they are spaced equidistantly around the circumference of ring 32.

The carbon disc and ring assembly 28 and 32 is retained within the bore 17 in housing 14 by a snap ring 52 which is engaged within a groove 54 after the ring and carbon disc assembly has been inserted within the housing 14. The depth to which the ring and carbon disc assembly 32 and 28 may recede is limited by engagement of the protrusions 48 with the end of grooves 50. The range of axial sliding movement allowed for the ring and carbon disc assembly 32 and 28 within the bore 17, is greater than the difference between W2 and W1 to assure that the carbon disc 28 is free to engage either of the faces 26 or 36 of the first and second rings 24 and 34, respectively.

Figure 6:
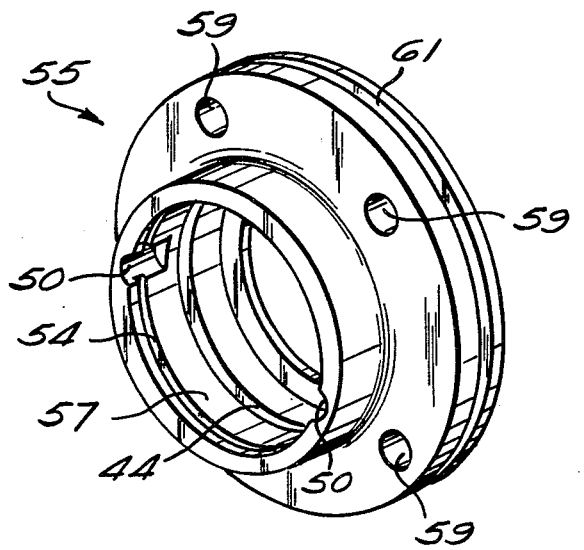
FIG. 6 is a perspective view of an auxillary subhousing in which a dynamic shaft seal is held.

FIG. 6 depicts an alternate subhousing structure 55 for holding the carbon disc and ring assembly 32 and 28, where it is advantageous in turbine design to provide a removable seal sub-assembly. The housing structure 55 has a bore 57 formed therethrough. The bore 57 has identical internal features as described and labeled for bore 16. Additionally, a plurality of small bores 59 are provided through subhousing 55 equally spaced around its periphery for receiving fasteners to mount the subhousing 55 to a turbine housing 14. A groove 61 may be provided (not shown) in the circumference of subhousing 55 to receive an O-ring (not shown) for sealing fluid leakage between subhousing 55 and housing 14.

The assembly of the dynamic shaft seal 20 is clearly shown in FIG. 3. The first ring 24 is positioned over the smaller and portion 19 of the shaft 18, forming a fluid-tight seal between the interior edge of its central opening 25 and the surface of the shaft 19. The first ring 24 is positioned on shaft portion 19 to abut shoulder 21.

The carbon disc and ring assembly 32 and 28 is positioned within the housing bore 16 with the tongues 48 engaging their mating grooves 50 in the wall of bore 16. In this position, the O-ring seal 44 forms a fluid-tight barrier between the circumference of the outer ring 32 and the housing 14 while allowing the carbon disc and ring 28 and 32 axial freedom of movement. The snap ring 52 is then positioned in its receiving groove 54 to retain the carbon disc and ring assembly 28 and 32 within the housing bore 17.

The second ring 34 is next positioned over the smaller end portion 19 of the shaft 18 and moved toward the first ring 24 until the spacing member 40 abuts the side of the first ring 24, capturing the floating carbon disc 28 bewteen the inwardly-facing sides 26 and 36 of the first and second rings 24 and 34 respectively.

Since the spacing between the inwardly directed faces 26 and 35 of the first and second rings is wider than the width of the carbon disc, the carbon disc and ring assembly is permitted a range of floating axial movement between the first and second rings, while the O-ring seal maintains a fluid-tight seal between the ring 32 and the housing 14, and the tongues 48 in their grooves 50 prohibit the ring and carbon disc 28 and 32 from rotating within the housing bore 17.

Operation of the dynamic shaft seal will now be described with reference to FIG. 4. The arrows on opposing sides of the carbon disc and ring 28 and 32, indicated as P1 and P2, represent the fluid pressures acting on opposing sides of the carbon disc and ring. Fluid will tend to flow in a direction from high pressure to low pressure. Fluid flow through the seal labyrinth is initially controlled by the clearance C between the outer surface of the spacing member 40 and the inner edge of central opening 31 through the carbon disc 28. The O-ring seal 44 acting between the circumference of ring 32 and the housing bore 16 prevents fluid leak therethrough while allowing axial movement of the carbon disc 28 between first and second rings 24 and 34.

The restriction created by clearance C maintains a pressure differential, a difference in pressure between the pressures P1 and P2, across the carbon disc 28 which creates an axial force acting on the carbon disc and ring 28 and 32. The force axially moves the carbon disc and ring 28 and 32 in the bore 16 within the range of movement it is allowed between the first and second rings 24 and 34.

For instance, if pressure P1 is greater than pressure P2, flow of fluid through clearance C will be restricted and a force generated against the left side of the carbon disc and ring 28 and 32 by the pressure differential (P1 minus P2) sliding the carbon disc and ring 28 and 32 to the right until the carbon disc face 29 engages the radial face 26 of the first ring 24, forming a contact seal therebetween. Similarly, if pressure P2 is greater than pressure P1, a force is generated against the right side of the carbon disc and ring 28 and 32, moving it to the left until the carbon disc face 30 engages the radial face 36 of second ring 34, forming a contact seal therebetween. The dynamic seal is thus bidirectionally effective, blocking axial fluid flow in either direction along the shaft 18.

Because the axial movement of the disc 28 is limited only by engagement with the faces 26 and 36, the seal is self-compensating for wear. Thus, as the disc 28 wears, it will move axially toward the ring 24 or 34 causing the wear, and the sealing properties of the ring will thus be maintained.

The force generated by the pressure differential across the carbon disc 28, creates a bearing load between the interface of an adjacent side 29 or 30 if the carbon disc and a radial side 26 or 36 of the rings, to provide a contact seal to block fluid flow. By properly designing the side surface area of the carbon disc, the force applied and thus the bearing load can be varied. Because the pressure differential (P1 to P2) across the carbon disc 28 remains relatively constant in steady state operation of the turbine, the axial force generated against the disc, and exerted between cbntacting surfaces will also remain constant. The contact seal between the carbon disc 28 and an adjacent ring 24 and 34 assures positive blockage of fluid flow along the shaft 18 through housing bore 17.

The carbon material of which the carbon disc 28 is made advantageously reduces friction between contacting surfaces 30 and 36 or 29 and 26 to a minimum due to its inherent lubricating ability, thereby preventing high wear rates and eliminating need of lubricating fluids.

When there is no pressure differential across the carbon disc 28, i.e., P.=P2, the carbon disc 28 is free to float between first and second rings 24 and 34 without bearing contact between adjacent surfaces, thereby reducing heat of friction and wear.

What is claimed is:

1. A dynamic shaft seal for bidirectional restriction of fluid flow along a rotating shaft, comprising:
   a first ring having a central opening for fluid-tight mounting of said ring on said shaft for rotation, said first ring having a flat radial face providing an axially directed sealing surface;
   a second ring having a central opening for fluid-tight mounting of said ring on said shaft for rotation, said second ring having a flat radial face to provide an axially directed sealing surface, said second ring face opposing said first ring face;
   means for spacing said second ring face a measured distance from said first ring face;
   a disc having substantially flat radial sides providing axially directed sealing surfaces adapted to engage said flat face of said first and second ring, said disc sized narrower in width than said measured distance to allow said disc a range of axial movement such that a side of said disc may contact a face of one or the other of said first or second rings, said disc having a central opening through which said shaft extends which is sized to provide a clearance for restriction of fluid flow therethrough without frictional contact;
   means for sealing fluid flow past the outer circumferential surface of said disc, said sealing means permitting axial movement of said disc for contact with one or the other of said first or second rings; and
   positive stop means for prohibiting rotation of said disc with said first and second rings, whereby said disc is axially moved by force of a pressure differential across said disc to make bearing contact between a sealing surface of said disc and a sealing surface of one or the other of said first or second rings to form a contact seal prohibiting fluid flow along said shaft.

2. A dynamic shaft seal for prohibiting fluid flow through a housing along a shaft, comprising:
   a pair of spaced circular rings mounted to said shaft for rotation said rings including opposing and inwardly facing surfaces for sealing contact;
   a sealing element held within said housing and axially movable therewithin, said sealing element positioned between said spaced rings and presenting outwardly facing surfaces on opposing sides for bearing contact with one or the other of said ring surfaces to form a fluid-tight seal between said sealing element and a circular ring;
   means for sealing said sealing element with said housing and allowing a range of axial movement of said sealing element within said housing while maintaining a fluid-tight seal; and
   positive stop means for prohibiting rotation of said sealing element relative said housing while permitting a range of axial movement of said sealing element within said housing, whereby said element is forced into sealing contact with one or the other of said circular rings by a fluid pressure differential across said sealing element.

3. A dynamic seal for prohibiting fluid leakage along a rotating shaft comprising:
   an axially immovable ring mounted for rotation with said shaft and having a substantially flat radial sealing surface;
   a floating disc axially movable for bearing engagement with said ring sealing surface to form a contact seal; and
   positive stop antirotation means for prohibiting rotation of said floating disc with said ring during bearing engagement and allowing axial movement of said floating disc; and whereby said sealing surface is moved into engagement with said ring sealing surface by force of a pressure differential between opposing sides of said disc.

4. A dynamic shaft seal for prohibiting fluid leakage along a shaft, comprising:
a first axially immovable means for presenting a radial sealing surface, said first means mounted on said shaft for rotation therewith;
a second axially movable means for engaging said radial sealing surface of said first rotatable means to provide a contact seal; and
positive stop means for prohibiting rotation of said second means with said first means.

5. The dynamic shaft seal of claim 1 wherein said means for spacing said first and second ring faces comprises a hub extending from one of said rings and extending through said disc central opening to abut the other of said rings, and having a width to provide said measured distance between said first and second rings to allow said disc a range of axial movement therebetween.

6. The dynamic shaft seal of claim 1 wherein said disc is made of carbon for low friction when engaged in sealing contact with one or the other of said first or second rings.

7. The dynamic shaft seal of claim 6 wherein said carbon disc is encased by a rigid ring, said ring providing axial and radial support for said carbon disc and including a circumferential sealing surface adapted to provide a fluid-tight seal with said sealing means.

8. The dynamic shaft seal of claim 1 wherein said means for sealing fluid flow past the circumference of said disc comprises an O-ring seal.

9. The dynamic shaft seal of claim 2 wherein said means for prohibiting rotation of said disc comprises a protrusion from the outer surface of said disc which mates with a corresponding elongate recess formed in said housing to prohibit rotational movement while allowing axial movement of said disc.

10. The dynamic shaft seal of claim 9 comprising a plurality of protrusions for prohibiting rotation of said disc relative said housing, said protrusions spaced equidistantly around the circumference of said disc to eliminate binding forces as said disc moves axially.

11. The dynamic shaft seal of claim 4 wherein said rotation prohibiting means permits axial movement of said second means to compensate for wear in said seal.

* * * * *